Figure 1:
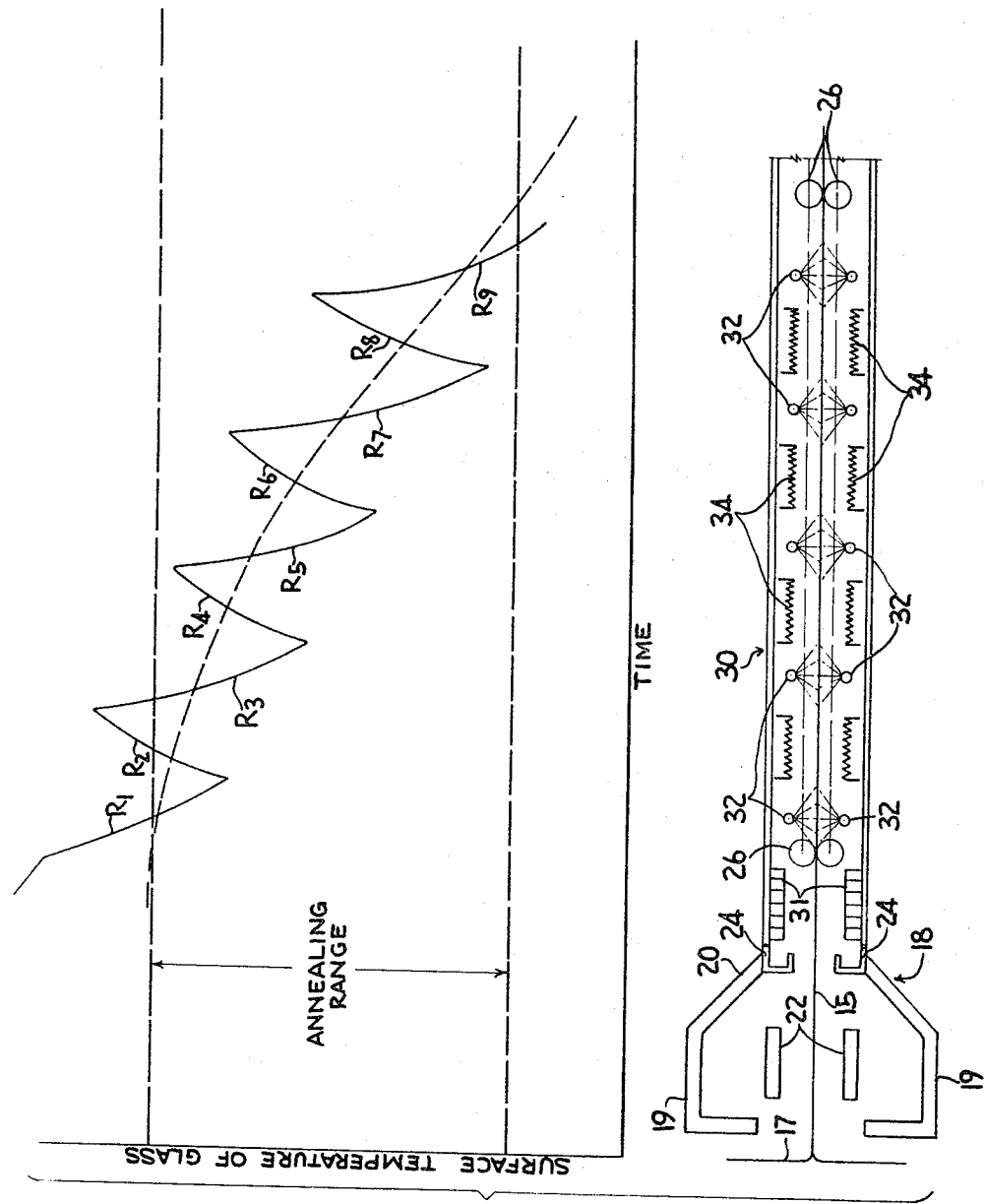

March 28, 1967     F. V. ATKESON     3,311,463
PROCESS OF ANNEALING GLASS SHEETS
Filed June 3, 1963     2 Sheets-Sheet 1

INVENTOR.
FLORIAN V. ATKESON
BY
Oscar L. Spencer
ATTORNEY

March 28, 1967 — F. V. ATKESON — 3,311,463
PROCESS OF ANNEALING GLASS SHEETS
Filed June 3, 1963 — 2 Sheets-Sheet 2

INVENTOR.
FLORIAN V. ATKESON
BY
Oscar L. Spencer
ATTORNEY

United States Patent Office 3,311,463
Patented Mar. 28, 1967

3,311,463
PROCESS OF ANNEALING GLASS SHEETS
Florian V. Atkeson, Springdale, Pa., assignor to Pittsburgh Plate Glass Company, Pittsburgh, Pa., a corporation of Pennsylvania
Filed June 3, 1963, Ser. No. 285,126
8 Claims. (Cl. 65—119)

This invention relates to the treatment of glass and, especially, to methods for cooling a glass ribbon or glass sheet in an easily controlled manner and in a relatively short time while improving the ease with which the final product may be cut.

Glass cooled in an uncontrolled manner is generally difficult to cut due to internal stresses of relatively large magnitudes existing within the glass. These stresses are created by temperature gradients established through the glass thickness as the glass is cooled through its annealing range. The ease with which glass may be cut is often improved by a process of annealing the glass. The intent of such a process is to optimize the time and rate of cooling to achieve the lowest residual stress within the glass in the time available for the cooling. This is generally accomplished by lowering the temperature of the glass through a defined annealing range in a manner that controls the temperature gradient and the internal stresses induced in the glass during the cooling process. Annealing schedules require relatively accurate control of temperature and time to produce low levels of residual stress in the glass, particularly where the available time for annealing is short, as in a vertical sheet glass drawing operation.

The present invention relates to a novel cooling schedule, particularly adapted to the treatment of flat glass in individual sheet or in ribbon form, that provides improved cutting characteristics by lowering the temperature of the glass through the annealing range in a series of alternate steps of cooling and heating.

More specifically, methods and apparatus have been developed that establish a stress distribution in a sheet or ribbon of glass to facilitate cutting by impinging a flow of air or other cooling gas upon the glass surfaces at spaced time intervals relative to any one portion of the glass while the temperature of the sheet or ribbon is within the annealing range of the glass. The glass is heated during the time intervals spacing the cooling steps, as by radiating heat to the surfaces of the sheet or ribbon. The result is an alternate withdrawal of heat from and introduction of heat to the glass. The magnitude, in terms of the temperature change of the glass, is controlled to withdraw a greater quantity of heat during the cooling steps than is introduced during the heating steps. Consequently, there is a net decrease in the glass temperature during the cycling of heat flow, and the ribbon or sheet is cooled stepwise from the upper limit of the annealing range to the lower limit. It has been found that the ratio of surface compressive stress to central tensile stress of a glass sheet or ribbon cooled in this manner is significantly less than that of annealed glass and that the glass may be readily and accurately cut without specifically minimizing the magnitude of the stresses.

Advantages attendant upon the cooling schedule of the present invention include the simplicity of the process and the elimination of the need for minimizing the value of the resultant stresses.

Figure 2:
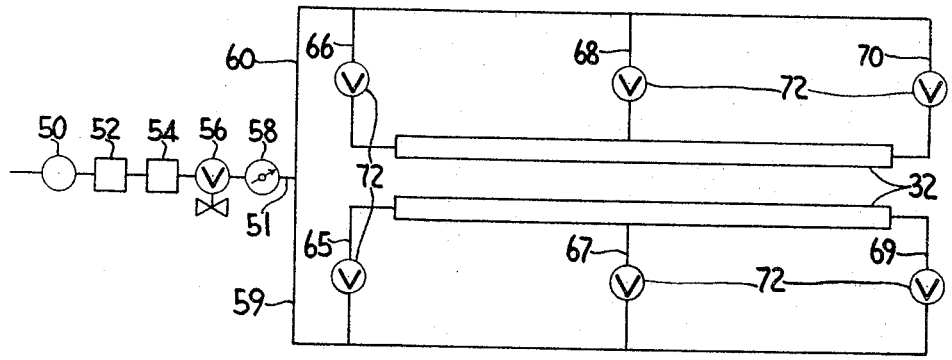
Figure 3:
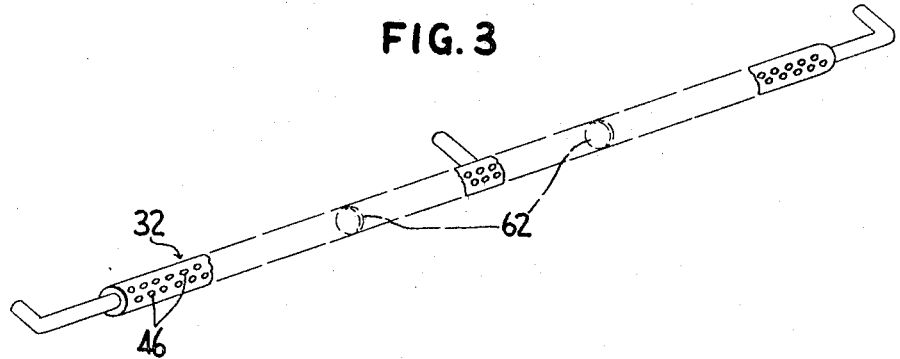

Other attendant advantages of this invention will be more readily appreciated as the same become better understood by reference to the following detailed description when considered in connection with the accompanying drawings in which:

FIG. 1 shows a temperature vs. time graph for a cooling schedule typical of the present invention and correlated with a diagrammatic, sectional elevation of a drawing chamber and the enclosed lehr of a glass drawing machine (positioned on one side to facilitate the graph) schematically indicating the relative location of the heating and cooling members that control the cooling schedule of the drawn ribbon;

FIG. 2 schematically shows a suitable air supply system for the air manifolds used in the present invention;

FIG. 3 shows structural details of an air manifold; and

Figure 4:
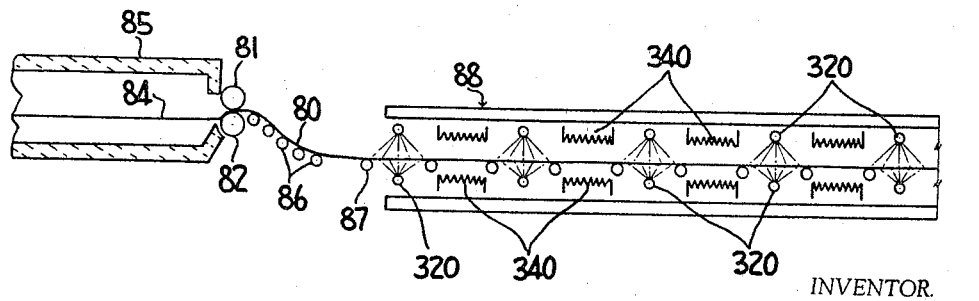

FIG. 4 diagrammatically shows the present invention applied to a horizontal lehr for annealing a continuously formed ribbon.

Referring now to the drawings, the graph of FIG. 1 illustrates, in terms of the surface temperature of the glass and the time of treatment, a typical cooling schedule of the present invention. As shown by the dotted line indicating the general trend of the temperature of the glass, the alternate steps of heating and cooling are selected to provide a net cooling effect that lowers the temperature of the glass through the annealing range within a predetermined time available for cooling. This general temperature trend may follow a line of gradual slope or may follow any generally known annealing curve, such as one where the temperature is maintained high for the first portion of the cooling schedule and then is dropped more rapidly at a gradually increasing rate. The alternate cooling and heating steps are maintained for periods of time of sufficient duration to establish cooling and heating gradients through the glass thickness to provide an alternate net heat flow from and to the glass.

The resultant effect of a temperature curve of the type shown in FIG. 1 is to provide a stress distribution through the thickness of the glass in which the surface compression is approximately equal in absolute value to the center tension. By way of comparison, the absolute value of surface compression in a conventionally annealed sheet of glass is about 1.75 to 2.25 times as great as the center tension. Because of the lower ratio of the surface compression stress to the center tension stress, glass treated in the manner herein disclosed may be easily cut. This holds true even though the actual stress value (e.g., the center tension, as indicated by the birefringent effect of the glass upon two-plane polarized light and expressed in terms of millimicrons per inch of glass path) is relatively high compared to annealed glass having similar cutting characteristics.

FIG. 1 shows the cooling process of this invention as applied to a process for drawing a continuous ribbon of glass 15 from a molten bath 17. As in conventional drawing apparatus, a drawing chamber 18 formed in part by L-blocks 19, ventilator water coolers 20, and cooled catch-pans 24 encloses an area above the bath and provides a suitable environment for the formation of the ribbon. Heat exchangers, such as water coolers 22, hasten the solidification or "setting" of the glass as the ribbon 15 is drawn from the bath 17 by a series of pairs of drawing rolls 26 and conveyed to a cutting station (not shown) several floors above the bath. The molten glass forming the bath 17 is maintained at a temperature of about 1800 degrees Fahrenheit, which is suitable for the drawing process. As the ribbon is formed and drawn through the drawing chamber 18 and into an enclosed lehr 30, which encloses that portion of the ribbon 15 that is within the temperature limits of the annealing range, it is first cooled from the high temperature of the bath by water coolers 22, the ambient air within the drawing chamber 18, and cooled catch-pans 24. In this manner the glass is cooled to a temperature of about 1200 degrees Fahrenheit by the time is leaves the drawing chamber. Radiant coolers 31 at the entrance of the annealing lehr 30 further reduce the temperature of the ribbon to approximately the upper limit of the annealing range. This portion of the cooling cycle which takes place above the upper temperature limit of the annealing range of the glass is common to known processes and the process of the present invention.

In accordance with the embodiment of this invention shown in FIG. 1, the temperature of a ribbon of glass is varied with respect to the position of the ribbon in the enclosed lehr 30 of the drawing machine. A representative temperature curve is shown by the graph of FIG. 1.

Cooling of the ribbon is established at spaced intervals along the lehr 30 in the direction of ribbon travel subsequent to the location of radiant coolers 31 by the impingement of cooling gas, such as ambient air, against the major surfaces of the ribbon. Gas is impinged on each side of the ribbon in opposed, narrow bands that extend across substantially the entire width of the ribbon. This gas is emitted from pairs of manifolds 32 that are supported within lehr 30 by suitable means, such as hangers 33, and that extend transversely across the width of the ribbon, parallel to and spaced from the surface of the ribbon. Gas outlet holes 46 in manifolds 32 are located to produce a cooling zone long enough in the direction of ribbon travel to act upon successive portions of the moving ribbon for a period of time sufficient to establish a cooling gradient through the ribbon.

Heating of the ribbon is established at spaced intervals along the lehr 30 between the spaced zones cooled by manifolds 32 by radiating heat to each side of the ribbon 15. To accomplish this, a plurality of electrical heating coils 34 are supported by the walls of lehr 30 and extend across the width of the lehr arranged in spaced bands adjacent each side of the ribbon between successive manifolds 32. Coils 34 provide heating zones of sufficient length in the direction of ribbon travel to supply heat to the ribbon for periods of time comparable to those during which the cooling takes place and provide heat of an intensity sufficient to establish a heating gradient through the ribbon in the time available.

With the above-described arrangement, and as shown by the graph of FIG. 1, the glass is cooled through steps $R_1$, $R_3$, $R_5$, $R_7$ and $R_9$ and heated through the alternate steps $R_2$, $R_4$, $R_6$ and $R_8$. Because the cooling steps are larger in magnitude than the heating steps, a general cooling trend is provided as indicated by the broken line indicating the general trend of the temperature of the ribbon. Because of the alternate establishment of heating and cooling gradients during the cooling process, the normal stress distribution through the glass thickness does not develop.

The time during which the ribbon is cooled and heated by manifolds 32 and coils 34 varies with the speed at which the ribbon travels. However, the fact that it takes more time to establish a gradient through a thicker ribbon compensates for the slower speed of ribbon travel due to the slower drawing speed for thicker glass, as governed by the forming process. This allows the same manifold structure and heating arrangement for all standard ribbon thicknesses. Furthermore, because the purpose of this process is not specifically to minimize the stress, the precise location in the lehr at which the temperature of the glass reaches the annealing range is not critical. Neither is the precise temperature of the glass at which the cooling or heating is applied within the annealing range critical.

As shown schematically in FIG. 2, a pair of manifolds 32 receives air from a common air supply 50. Air is piped first from the source through a main air line 51 equipped with a filter 52, a pressure regulator 54, a gate valve 56, and pressure gauge 58. Two main feed lines 59 and 60 divide the flow from the main air line 51 to supply each of the manifolds with equal air pressure. The manifolds are divided into three sections, as by air blocks 62 indicated in phantom. See FIG. 3. Section feed lines 65, 67 and 69 supply the individual sections of one of the manifolds from main feed line 59, and section feed lines 66, 68 and 70 supply the sections of the other manifold of the pair from main feed line 60. Each section feed line includes a valve 72 to control and allow for varying the air flow across the width of the ribbon. Outlet holes 46 (FIG. 3) are closely spaced and extend along the length of that portion of each manifold that faces the glass ribbon. These outlet holes are arranged in two parallel rows along the manifold 32 so as to impinge the air over a sufficiently wide area of the glass ribbon. Preferably, the manifolds are spaced approximately 3 to 6 inches from the major surfaces of the glass upon which they direct the cooling gas.

FIG. 4 diagrammatically shows a typical horizontal lehr for controlling the cooling of a continuously rolled ribbon of glass. A ribbon 80 is first formed in a conventional manner from a molten bath of glass 84 in a tank 85 by forming rolls 81 and 82, and is then conveyed down the apron rolls 86 leading from the tank and thence onto conveyor rolls 87 and into the lehr 88. As the ribbon enters the lehr, spaced pairs of air manifolds 320 and alternate rows of heating elements 340, both extending across the width of the ribbon, alternately cool and heat the ribbon in a manner similar to that described in connection with the drawing machine of FIG. 1. It will be understood that individual sheets of glass may also be treated in this manner to improve the cutting characteristics. It is necessary, of course, to initially heat such sheets to a temperature above the annealing range.

The following is an example, by way of illustartion only, of a preferred mode of manufacturing sheet glass utilizing the embodiment of the present invention shown in FIG. 1.

A ribbon of glass approximately 100 inches wide and $7/32$-inch thick is continuously formed by being mechanically drawn from a partially enclosed bath of molten glass maintained at a temperature of approximately 1800 degrees Fahrenheit and consisting of:

| | Percent by weight |
|---|---|
| $SiO_2$ | 71.38 |
| $Na_2O$ | 12.79 |
| $CaO$ | 9.67 |
| $MgO$ | 4.33 |
| $Na_2SO_4$ | 0.75 |
| $NaCl$ | 0.12 |
| $Fe_2O_3$ | 0.15 |
| $Al_2O_3$ | 0.81 |

The ribbon, formed and drawn upwardly by the traction of pairs of opposed drawing rolls acting upon the already formed portion of the ribbon, first passes between a pair of vertically disposed heat exchangers within the drawing chamber and then between catch-pan coolers on each side of the ribbon at the exit end of the drawing chamber as it passes into a lehr. These coolers and the ventilator coolers, which enclose the drawing chamber, cool the ribbon to approximately 1150 degrees Fahrenheit as it leaves the drawing chamber. Radiant coolers adjacent the catch-pan coolers and within the lehr lower the temperature of the ribbon to 1075 degrees centigrade. Air is then impinged upon the glass ribbon on each side thereof in the form of a strip across the width of the ribbon. The air is supplied from a pair of manifolds, one on each side of the ribbon, approximately 6 inches from each side of the ribbon surfaces and extending across the width thereof transversely to the direction of ribbon travel. Each manifold of the first and succeeding pairs of manifolds is formed of a 90-inch long stainless steel pipe having an inside diameter of 1½ inches and is divided into three 30-inch sections along the length thereof. A total of 337 outlet holes approximately $1/10$ inch in diameter on centers spaced ½ inch apart are formed in two parallel straight lines along the longitudinal axis of the pipe forming the manifold. The outlet holes are so arranged as to direct a flow of air against the surface of the ribbon over a width of several inches. The rate of flow and temperature of the air are correlated so as to reduce the temperature of the ribbon approximately 1 to 3 degrees Fahrenheit per second. The air impingement lowers the temperature of the glass to 1020 degrees Fahrenheit in 20 seconds. In successive, alternate steps, the glass is heated for 30 seconds to 1060 degrees Fahrenheit, then cooled for 25 seconds to 995 degrees Fahrenheit, then heated for 30 seconds to 1035 degrees Fahrenheit, then cooled for 30 seconds to 975 degrees Fahrenheit, then heated for 30 seconds to 1020 degrees Fahrenheit, then cooled for 35 seconds to 945 degrees Fahrenheit, then heated for 30 seconds to 995 degrees Fahrenheit, then cooled for 35 seconds to 935 degrees Fahrenheit. Heat is supplied by electrical heating coils controlled by thermocouples. The annealing range for the glass of this example is taken to be from 1040 degrees Fahrenheit to 935 degrees Fahrenheit. The ribbon is cooled through this temperature range in approximately 265 seconds. After the temperature of the ribbon reaches the lower limit of the annealing range, the ribbon is allowed to cool at a natural rate as it is drawn to the cutoff floor, approximately 15 feet above the enclosed portion of the drawing machine, at which point it is at a temperature of approximately 120 degrees Fahrenheit and is cut into discrete sheets. Specific tests performed with ¼-inch-thick polished plate glass samples cycled for the times and temperatures above specified in the example resulted in a surface compression of 210 millimicrons per inch and a center tension of 180 millimicrons per inch, as indicated by the birefringent effect of the glass upon two-plane polarized light waves passing through the glass. The glass cut easily and accurately. A similar plate cooled steadily in ambient air from 1200 degrees Fahrenheit resulted in a central tension of 700 millimicrons per inch and a surface compression of 1240 millimicrons per inch. This glass was impossible to cut accurately.

It should be understood that the observed annealing range for any particular cooling schedule might well vary, depending upon the rate of cooling and the composition of the glass. Of course, the specific temperatures and times set forth in the operating example need not be followed, and in particular will be varied where the time available for cooling is different. Thus, while times of the magnitude of 25 to 35 seconds and temperature drops of the magnitude of 20 to 75 degrees Fahrenheit have been cited in the above example, it is contemplated that times of a duration between about 6 seconds and 50 seconds may be used to establish the cooling or heating gradient, and temperature changes between 10 degrees and 90 degrees Fahrenheit may be utilized in practicing the above operation. The actual number of temperature variations imposed upon the glass during the cooling through the annealing range is primarily a matter of practical limitations. However, it is necessary that there be at least two cooling steps separated by one heating step within the annealing range.

While cooling by impingement of a gas such as air upon the glass is specifically contemplated herein, it will be readily apparent that the cooling may be accomplished by other means such as by radiative pick up, e.g., with finned, coolant-containing tubes.

Where separate sheets are to be treated in accordance with this invention, it will be apparent that the cycling of heat flow may be accomplished by alternately subjecting the entire sheet to cooling and heating cycles.

It should be understood that the foregoing disclosure is intended to cover all changes and modifications of the examples of the invention herein chosen for the purposes of the disclosure which do not constitute departures from the spirit and scope of the invention as set forth in the appended claims.

I claim:
1. A process of treating glass which comprises alternately impinging a cooling gaseous fluid upon the glass and radiating heat to the glass, each for a period of time of between 6 seconds and 50 seconds, so as to change the temperature of the glass an amount of between 10 degrees and 90 degrees Fahrenheit, and reducing the temperature of the glass at least as great a number of degrees Fahrenheit during any cooling step as the temperature of the glass is raised during an immediately subsequent heating step while the temperature of the glass is within the annealing range of the glass.

2. A process of treating glass in sheet or ribbon form while at temperatures within the annealing range of the glass which comprises alternately cooling and heating major surfaces of the glass for times and at rates sufficient to establish alternate cooling and heating temperature gradients through the thickness of said glass from the major surfaces to a central plane of the sheet or ribbon.

3. The process of claim 2 wherein the said cooling is accomplished by impinging a flow of gas upon major surfaces of the glass for periods of time in excess of 6 seconds.

4. The process of claim 2 wherein the said heating is accomplished by radiating heat to major surfaces of the glass for periods of time in excess of 6 seconds.

5. The process of claim 2 wherein the said cooling is accomplished by radiantly absorbing heat from the glass.

6. A process of treating glass, which comprises cooling the glass through the temperature range between the upper temperature limit of the annealing range of the glass and the lower temperature limit of the annealing range by alternately cooling and heating the glass during a plurality of time periods of between 25 and 35 seconds each and changing the temperature of the glass an amount of between 20 and 75 degrees Fahrenheit during each of said periods.

7. The process of claim 6 wherein the temperature of the glass is lowered during each cooling step an amount at least as great as the temperature is increased during an immediately subsequent heating step.

8. The process of claim 7 wherein the alternate cooling and heating of the glass establishes a generally gradual temperature trend in the glass from the upper temperature limit of the annealing range to the lower temperature limit of the annealing range said cooling steps being such that the temperature after each cooling step is lower than that of the next previous cooling step and said heating steps are such that the temperature after each heating step is lower than that of the next previous heating step.

References Cited by the Examiner
UNITED STATES PATENTS

| 1,974,058 | 9/1934 | Wadman | 65—119 |
|---|---|---|---|
| 3,107,196 | 10/1963 | Acloque | 65—95 X |

FOREIGN PATENTS 778,338   12/1934   France.

DONALL H. SYLVESTER, *Primary Examiner.*

A. D. KELLOGG, *Assistant Examiner.*